US006234519B1

(12) United States Patent
Breed

(10) Patent No.: US 6,234,519 B1
(45) Date of Patent: *May 22, 2001

(54) ARRANGEMENTS AND METHODS FOR CONTROLLING DEPLOYMENT OF A VEHICULAR OCCUPANT RESTRAINT DEVICE

(75) Inventor: David S. Breed, Boonton Township, Morris County, NJ (US)

(73) Assignee: Automotive Technologies International Inc., Denville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/452,735

(22) Filed: Dec. 1, 1999

Related U.S. Application Data

(63) Continuation-in-part of application No. 08/358,976, filed on Dec. 19, 1994, now Pat. No. 6,009,970, and a continuation of application No. 08/104,246, filed on Aug. 9, 1993, now abandoned, and a continuation of application No. 07/727,756, filed on Jul. 9, 1991, now abandoned.

(51) Int. Cl.$^7$ ............................................. B60R 21/32
(52) U.S. Cl. .................................. 280/735; 180/274
(58) Field of Search .......................... 280/735; 180/271, 180/274, 282

(56) References Cited

U.S. PATENT DOCUMENTS

| | | | |
|---|---|---|---|
| 2,437,969 | 3/1948 | Paul | 200/86 |
| 3,495,675 | * 2/1970 | Hass et al. | |
| 3,694,000 | 9/1972 | Koenig | 200/86 R |
| 3,701,903 | * 10/1972 | Merhar | 307/9.1 |
| 3,853,199 | * 12/1974 | Hirashima et al. | 180/274 |
| 3,859,482 | 1/1975 | Matsui et al. | 200/61.08 |
| 3,874,695 | * 4/1975 | Abe et al. | 280/735 |
| 3,889,232 | * 6/1975 | Bell | 280/735 |
| 3,974,350 | 8/1976 | Breed | 200/61.53 |

(List continued on next page.)

OTHER PUBLICATIONS

"Trends in Sensing Frontal Impacts", D. Breed et al., SAE Paper No. 890750, Feb., 1989.

(List continued on next page.)

Primary Examiner—Paul N. Dickson
(74) Attorney, Agent, or Firm—Brian Roffe

(57) ABSTRACT

Crash sensor arrangements and methods for determining whether a crash involving a vehicle requires deployment of an occupant restraint device in which a first crash discriminating sensor is mounted in a crush zone of the vehicle and triggers as a result of a reaction of the crush zone to the crash, such as the crush of the crush zone, velocity change of the crush zone, acceleration of the crush zone and/or functions thereof, a second discriminating crash sensor is mounted outside of the crush zone and triggers by means other than crush of the crush zone. For example, the second discriminating crash sensor triggers based on a change in velocity of the vehicle, acceleration of the vehicle and/or functions thereof. The first discriminating sensor may be a tape switch crush sensor. The first and second discriminating crash sensors are coupled to one another such that a signal to deploy the occupant restraint device is generated in consideration of whether both sensors have triggered. For example, the sensors may be coupled to one another in series such that the signal to deploy the occupant restraint device is generated only when both sensors are triggered. In the alternative, the second sensor may be arranged to receive a signal indicative of triggering of the first sensor, or information about the reaction of the crush zone therefrom, and modify its triggering based on the triggering of the first sensor or such information about the reaction of the crush zone to the crash.

43 Claims, 12 Drawing Sheets

U.S. PATENT DOCUMENTS

| | | | |
|---|---|---|---|
| 4,060,705 | 11/1977 | Peachey | 200/153 M |
| 4,198,864 | 4/1980 | Breed | 73/492 |
| 4,284,863 | 8/1981 | Breed | 200/61.53 |
| 4,329,549 | 5/1982 | Breed | 200/61.45 M |
| 4,573,706 | 3/1986 | Breed | 280/734 |
| 4,900,880 | 2/1990 | Breed | 200/61.45 M |
| 4,995,639 | 2/1991 | Breed | 280/735 |
| 5,031,931 * | 7/1991 | Thuen et al. | 280/735 |
| 5,322,323 | 6/1994 | Ohno et al. | 280/730 A |
| 5,390,951 * | 2/1995 | Iyoda | 280/735 |
| 5,441,301 | 8/1995 | Breed et al. | 280/735 |

OTHER PUBLICATIONS

"A Critique of Single Point Sensing", D. Breed et al., SAE Paper No. 920124, Feb., 1992.

"Using Vehicle Deformation to Sense Crashes", David S. Breed et al., Presented at the International Body Engineering Conference, Sep. 21, 1993–Sep. 23, 1993.

"A Complete Frontal Crash Sensor System–1", Society of Automotive Engineers, David S. Breed et al., Paper No. 930650, Mar. 1–5, 1993.

"A Complete Frontal Crash Sensor System–II", Proceedings of Enhanced Safety of Vehicle Conference, Munich, Germany, 1994, Published by the U.S. Dept. of Trans., National Highway Safety Administration, Washington, D.C., pp. 1377–1387.

"Problems in Design and Engineering of Air Bag Systems", Society of Automotive Engineers, David S. Breed et al., Paper No. 880724, Feb. 29–Mar. 4, 1988.

"Performance of a Crush Sensor for Use with Automotive Air Bag Systems", Society of Automotive Engineers, David S. Breed et al. Paper No. 920122, Feb. 24, 1992–Feb. 28, 1992.

"Are Barrier Crashes Sufficient For Evaluating Air Bag Sensor Performance?", Society of Automotive Engineers, David S. Breed et al., Paper No. 900548, Feb. 26–Mar. 2, 1990.

* cited by examiner

ARRANGEMENTS AND METHODS FOR CONTROLLING DEPLOYMENT OF A VEHICULAR OCCUPANT RESTRAINT DEVICE

CROSS REFERENCE TO RELATED APPLICATIONS

This application is a continuation-in-part of U.S. patent application Ser. No. 08/358,976 filed Dec. 19, 1994 now U.S. Pat. No. 6,009,970 which in turn is a continuation of U.S. patent application Ser. No. 08/104,246 filed Aug. 9, 1993, now abandoned, which in turn is a continuation of U.S. patent application Ser. No. 07/727,756 filed Jul. 9, 1991, now abandoned.

FIELD OF THE INVENTION

This invention relates to arrangements and methods for controlling deployment of a vehicular occupant restraint device utilizing a plurality of crash sensors, at least one of which is mounted in the crush zone of the vehicle and another of which is mounted outside of the crush zone.

This invention also utilizes improvements on the inventions disclosed in U.S. Pat. No. 4,995,639 (Breed) and a full discussion of the background of this general type of sensor is disclosed in that patent and included herein by reference.

BACKGROUND OF THE INVENTION

Many types of vehicular crash sensors have been proposed and used for determining if a crash involving the vehicle is severe enough to require the deployment of a passive restraint system such as an air bag or seat belt tensioner.

Three types of sensors have been widely used to sense and initiate deployment of an air bag passive restraint system. These sensors include an air damped ball-in-tube sensor such as disclosed in U.S. Pat. Nos. 3,974,350, 4,198,864, 4,284,863, 4,329,549 and 4,573,706 (all in the name of Breed), a spring mass sensor such as disclosed in U.S. Pat. Nos. 4,116,132 and 4,167,276 (both in the name of Bell) and an electronic sensor such as is now part of several air bag systems. Each of these sensors has particular advantages and shortcomings that were discussed in detail in U.S. Pat. No. 4,995,639 referenced above.

The use of tape or ribbon switch technology as a crush switch was also disclosed in the '639 patent. Further research has shown that an improvement of this particular implementation of the invention has significant advantages over some of the other implementations since the switch can be easily made long and narrow and it can be made to respond to bending. In the first case, it can be designed to cover a significant distance across the vehicle which increases the probability that it will be struck by crushed material or bent as the crush zone propagates rearward in the vehicle during a crash. In the second case, it can be made small and located to sense the fact that one part of the vehicle has moved relative to some other part or that the structure on which the sensor is mounted has deformed.

Other crush zone mounted crash sensors including crush switch designs where the width and height dimensions are comparable, must either be large and thus heavy, expensive and difficult to mount, or there is a possibility that the randomly shaped crushed material which forms the boundary of the crush zone will bridge the sensor resulting in late triggering. This crushed material frequently contains holes, wrinkles or folds or portions that may even be displaced or torn out during the crash with the result that it is difficult to guarantee that a particular small area where the sensor is mounted will be struck early in the crash.

A significant improvement results, therefore, if the sensor can stretch across more of the vehicle or if it can determine that there has been relative motion or deformation of a portion of the vehicle on which the sensor is mounted. The improved sensors described herein are small in height and thickness but can extend to whatever length is necessary to achieve a high probability of a sensor triggering on time in a crash. A short sensor can be used if it is carefully mounted onto portions of the vehicle that will cause the sensor to bend during a crash.

It has been found that conventional designs of tape or ribbon switches have the drawback that the force required to close the switch is very small compared with the forces which are normally present in automobile crashes. During routine maintenance of the vehicle, the normal tape switch may be damaged or otherwise made to close and remain closed, with the result that later, when the vehicle encounters a pot hole or other shock sufficient to cause the arming sensor to close, an inadvertent air bag deployment can result. Similarly, if the tape switch is mounted on the front of the radiator support, which is a preferred mounting locating for crush zone sensors, hail, heavy rain, stones or other debris from the road might impact the tape switch and cause a momentary closure or damage it. If this happens when the vehicle experiences a shock sufficient to cause the arming sensor to close, an inadvertent air bag deployment might also occur. The force typically required to close a tape switch is less than one pound whereas tens of thousands of pounds are required to stop a vehicle in a crash and local forces greatly in excess of 20 pounds are available to actuate a sensor during a crash.

The present invention seeks to eliminate these drawbacks through the use of a tape switch design that requires either a large force to actuate or a bending of the switch due to structural deformation as explained below.

In 1991, the inventor of the current invention published a paper titled "A Critique of Single Point Sensing", SAE 920124, 1992, which is included herein by reference, where the authors demonstrate that there is insufficient information in the non-crush zone of the vehicle to permit a decision to be made to deploy an airbag in time for many crashes. The CrushSwitch™ crash sensors described herein and in U.S. Pat. No. 5,441,301 to Breed et al., provide an apparatus and method for determining that the crush zone of the automobile has undergone a particular velocity change. This information can be used by itself to make the airbag deployment decision. As airbag systems become more sophisticated, however, the fact that the vehicle has undergone a velocity change in the crush zone can be used in conjunction with an electronic sensor mounted in the passenger compartment to not only determine that the airbag should be deployed but an assessment of the severity of the crash can be made. In this case, the front crush zone mounted sensor of the type disclosed herein can be used as an input to an electronic algorithm and thereby permit a deployment strategy based on the estimated severity of the accident. Although the sensors described herein are one preferred approach of providing this capability, the sensors disclosed in the above referenced patents would also be suitable. Alternately, in some cases, sensors of another design can fulfil this function. Such sensors might be based on the electromechanical technologies such as the ball-in-tube sensor described in U.S. Pat. No. 4,900,880 or in some cases even electronic sensors could be used as crush zone mounted sensors for this purpose.

OBJECTS AND SUMMARY OF THE INVENTION

A preferred embodiment of the sensor of this invention uses the crushing of the vehicle itself as a measure of the severity or velocity change of the crash as is the case with the other designs in the patent cross referenced immediately above. However, a key teaching of this invention is also the combination of forward or satellite sensors in the crush zone and a non-crush zone sensor and how that combination improves the overall performance of the sensor system. The particular improvements over the earlier tape switch versions of the crush sensing switch, are the requirement that a substantial force be applied to the sensor or that the structure upon which the sensor is mounted deforms. Since large forces or structural deformations are unlikely to occur except when the vehicle is in an accident, these requirements serve to further distinguish a crash from a non-crash event. Other advantages also easily result from the sensor of this design that could be achieved with sensors of different designs as explained below.

A principal object of this invention is to provide a tape switch type crush switch crash sensor which requires a substantial force to function.

Another object of this invention is to provide a crush switch crash sensor which functions when a portion of the vehicle where the sensor is mounted is displaced, deformed or otherwise bends or buckles.

A further object of this invention is to provide a crash sensor that latches closed in an accident where an air bag is required.

Yet another object of this invention is to provide a crush switch type crash sensor which does not require a strong mounting structure.

An additional object of this invention is to provide a small inexpensive yet highly reliable crash sensor.

Still another object of this invention is the use of a crush zone mounted discriminating sensor (which provides information about the reaction of the crush zone to a crash, such as the crush of the crush zone, the velocity change of the crush zone resulting from the crash and the acceleration of the crush zone resulting from the crash) in series with a passenger compartment mounted discriminating sensor to permit a better discrimination between air bag desired and not desired crashes such as animal impacts.

A further object of this invention is to use a crush zone mounted discriminating sensor as input to an electronic passenger compartment discriminating sensor to permit a change in the sensor algorithm, or triggering parameters, based of the output of the crush zone discriminating sensor to improve the performance of the electronic sensor.

Accordingly, in order to achieve the latter two objects, a crash sensor arrangement for determining whether the crash involving the vehicle requires deployment of the occupant restraint device in accordance with the invention comprises a first discriminating crash sensor mounted in a crush zone of the vehicle and structured and arranged to trigger based on a reaction of the crush zone to the crash and a second discriminating crash sensor mounted outside of the crush zone of the vehicle and structured and arranged to trigger by means other than crush of the crush zone of the vehicle, e.g., based on acceleration or a change in velocity of the entire vehicle or a part thereof Some typical reactions of the crush zone which are useful in determining triggering of the first discriminating crash sensor are the crush of the vehicle crush zone, acceleration of the vehicle crush zone, or velocity change of the vehicle crush zone. The first and second discriminating sensors are coupled to one another such that a signal to deploy the occupant restraint device is generated in consideration of whether the first sensor has triggered and whether the second sensor has triggered. Thus, in certain crashes, the occupant restraint device will not deploy unless both sensors have been triggered, i.e., the conditions imposed on each crash sensor for deploying the occupant restraint device have been satisfied.

In one embodiment, the sensors are coupled to one another in series such that the signal to deploy the occupant restraint device is generated only when the first and second sensors are both triggered. In another embodiment, the second sensor receives a signal indicative of triggering of the first sensor, considers whether to modify its triggering algorithm, triggering criteria and/or sensitivity based on the triggering of the first sensor and if so, modifies the triggering algorithm, criteria or sensitivity. If the second sensor is an electronic sensor arranged to trigger based on a change in velocity and/or acceleration of the vehicle (or functions thereof), the velocity change and/or acceleration (or functions thereof) required for triggering may be modified based on the triggering of the first sensor. It should be noted though that such modification is not required in the event the velocity change is already appropriate.

The first discriminating sensor mounted in the crush zone may be a tape switch crush sensor including a tape switch comprising a pair of electrically conductive members spaced apart from one another prior to crush of the vehicle and which are designed to come into contact with one another upon crush of the vehicle of a specific magnitude. The tape switch crush sensor can include means for reducing the sensitivity of the tape switch, such as an encapsulating member around the tape switch. The first discriminating sensor may also be a ball-in-tube sensor or an electronic sensor.

Another embodiment of a crash sensor arrangement for determining whether the crash involving the vehicle requires deployment of the occupant restraint device comprises a first discriminating crash sensor mounted outside of the crush zone of the vehicle and structured and arranged to trigger by means other than crush of the crush zone of the vehicle, and a second discriminating crash sensor coupled to the first sensor and mounted in the crush zone of the vehicle, e.g., a tape switch crush sensor or an electronic sensor. The second sensor provides information about a reaction of the crush zone of the vehicle to the crash, e.g., information about crush, velocity or acceleration of the vehicle crush zone, to the first sensor such that the first sensor may affect and modify its triggering and/or sensitivity based on the information about crush, velocity or acceleration of the vehicle crush zone provided by the second sensor, if such modification is necessary.

The method for determining whether the crash involving the vehicle requires deployment of an occupant restraint device comprises the steps of mounting a first crash sensor in the crush zone of the vehicle, e.g., a tape switch crush sensor or an electronic crash sensor, and which is triggered based on a reaction of the crush zone to the crash (e.g., crush, velocity change or acceleration, or a function thereof, of the vehicle crush zone), mounting a second crash sensor outside of the crush zone of the vehicle and which is triggered by means other than crush of the crush zone of the vehicle, and deploying the occupant restraint device in consideration of whether the first sensor has triggered and whether the second sensor has triggered. If the first and second sensors are coupled to one another in series, the occupant restraint device may be deployed only when the first and second sensors are both triggered (for certain types of crashes). In the alternative, a signal indicative of triggering of the first sensor is directed to the second sensor and consideration is made as to whether the conditions for triggering of the second sensor should be affected and modified based on the triggering of the first sensor. If so, the triggering conditions are modified.

In another method for determining whether a crash involving a vehicle requires deployment of an occupant restraint device, a first discriminating crash sensor is mounted outside of the crush zone of the vehicle and is triggered to deploy the occupant restraint device by means other than crush of the crush zone of the vehicle, and a second discriminating crash sensor is mounted in the crush zone of the vehicle such that the second sensor generates information about a reaction of the crush zone to the crash. As above, such reactions may be typically the crush, velocity change or acceleration of the vehicle crush zone. The second sensor may be a tape switch crush sensor which provides information about whether the crush of the vehicle has progressed to the mounting location of the tape switch crush sensor or it may be an electronic sensor that uses the acceleration in the crush zone to determine sensor triggering. The information about the reaction of the crush zone of the vehicle to the crash is provided by the second sensor to the first sensor and deployment of the occupant restraint device is controlled via the first sensor based on the information about the reaction of the crush zone of the vehicle to the crash provided by the second sensor.

Further objects and advantages of this invention will become obvious from the discussion below.

BRIEF DESCRIPTION OF THE DRAWINGS

The following drawings are illustrative of embodiments of the invention and are not meant to limit the scope of the invention as encompassed by the claims, in particular, this invention is not limited to the use of a particular sensor design located in the crush zone although the preferred example of a tape switch is used for illustration.

DETAILED DESCRIPTION OF THE PREFERRED EMBODIMENTS

Figure 1A:
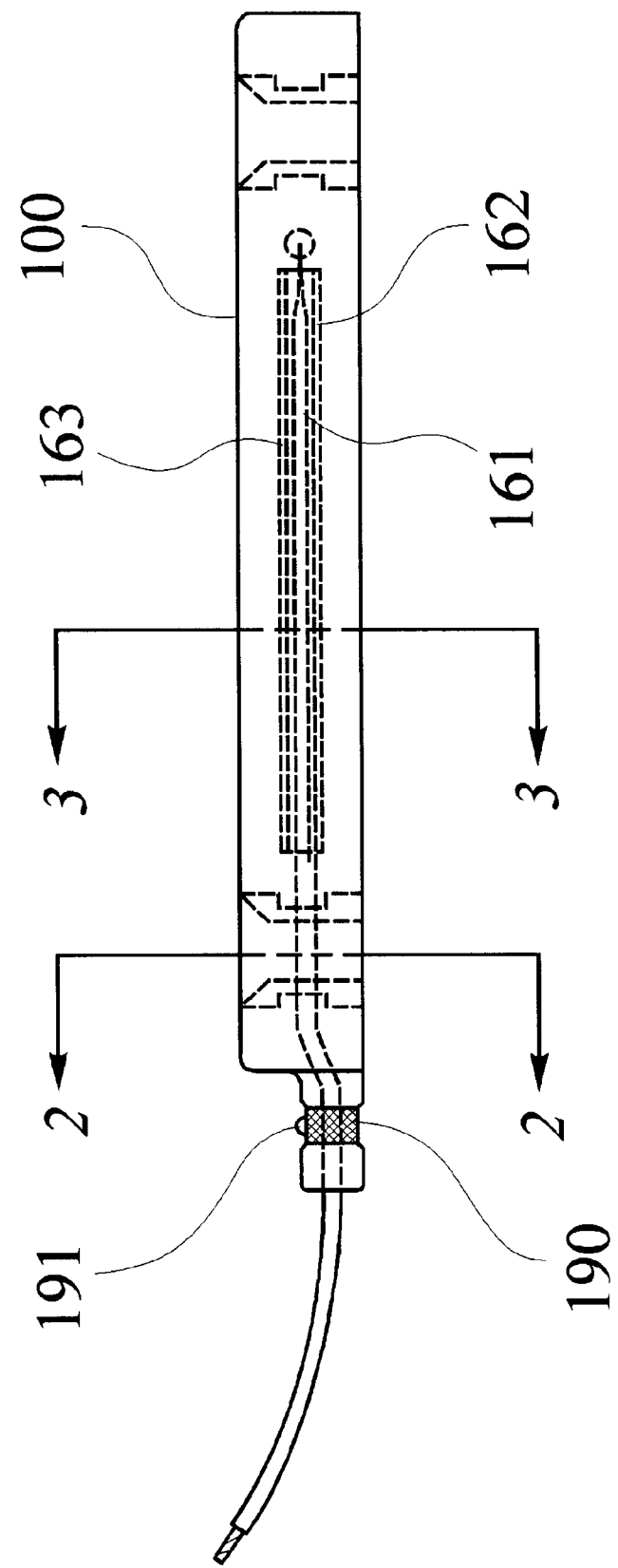
FIG. 1A is a plane view of a preferred embodiment of the crush sensor of this invention using a flex action tape switch.
Figure 1B:
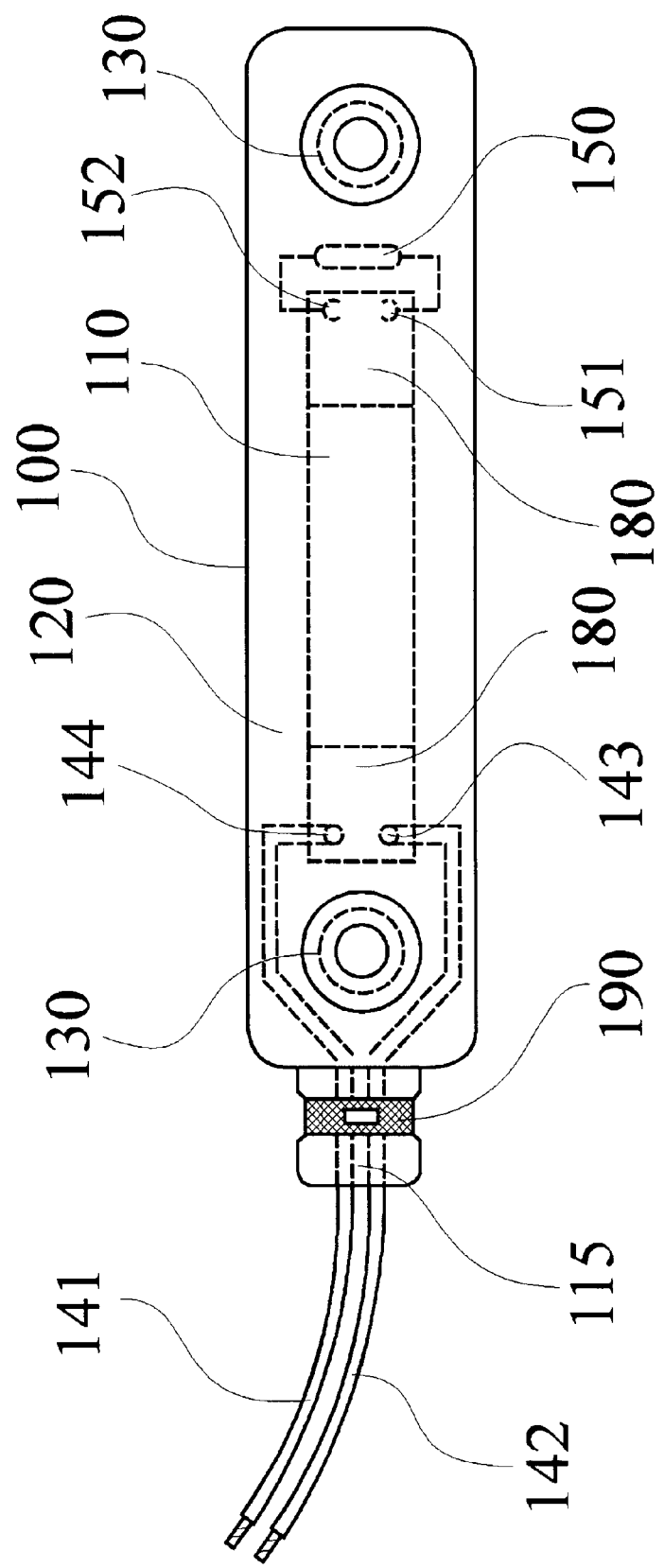
FIG. 1B is a plane view of the preferred embodiment of the crush sensor of this invention of FIG. 1A as viewed from the top.

Referring to the accompanying drawings wherein like reference numerals refer to the same or similar elements, a preferred implementation of the present invention is shown at 100 in FIG. 1A and FIG. 1B. A tape switch of any convenient length 110 is encapsulated by a thick elastomeric material 120. Wires 141 and 142 connect the sensor to other instrumentality of the restraint system. Wires 141 and 142 enter the sensor through strain relief grommet 115 that can also be made at the same time and of the same elastomeric material as 120. Eyelets 130, preferably made from metal, along with suitable fasteners such as bolts or sheet metal screws (not shown), provide the mounting hardware for attaching the sensor to a vehicle.

If the wires 141 and 142 are each made of a single strand, a near hermetic seal can be obtained by the proper pretreatment of the wires on the portion which passes through the grommet to cause them to be chemically bounded to the elastomeric material, as described in U.S. Pat. No. 3,522,575 of Watson et al. If the wires are multi-stranded, a reasonably good seal can be obtained if the wires are of the non-wicking type either through the chemical bonding between the elastomeric material 120 and the impregnating plastic used to render the wires non-wicking, or through the use of a metal clamping ring 190 as shown in FIG. 1. Ring 190 initially is larger than grommet 115 and is deformed at 191 to squeeze the ring around grommet 115. Such a ring places the elastomeric material in compression forming a seal around the wires 141 and 142. If the wires 141 and 142 are multi-stranded and not made non-wicking, the portion of the wire passing through grommet 115 can be fused together to form a single solid strand and handled in the same manner as the single strand case above. This fusing can be accomplished if the wire strands are coated with a metallic coating such as tin as is commonly done with tinned wire. In this case the tinning is thicker than normal and the portion of the wire that is to be fused is heated until the tin melts fusing the strands together and forming a solid. In any of these cases, it can be seen that this sensor can be easily sealed to prevent passage the of water or other contaminants into the sensor. This ease of sealing renders this sensor particularly suited for mounting in the crush zone of the vehicle where the sensor is exposed to rain, sleet, salt spray, radiator fluids, battery acid and other corrosive chemicals. This elastomeric encapsulation and compression band sealing method is also applicable to other sensor designs. Wires 141 and 142 are attached to contact strips 161 and 162 at 143 and 144 by any convenient manner such as crimping or soldering. A diagnostic resistor 150 can be provided to permit the monitoring of the readiness of the sensor by the diagnostic system located elsewhere in the vehicle. This resistor 150, if present, is also attached to contact strips 161 and 162 at 151 and 152, as shown in FIG. 1B.

The contact strips 161 and 162 are prevented from making contact in the non-actuating condition by insulator pads 180. A third metal strip 163, as shown in FIG.3, can be provided to aid in the operation of the sensor as described below.

Figure 2:
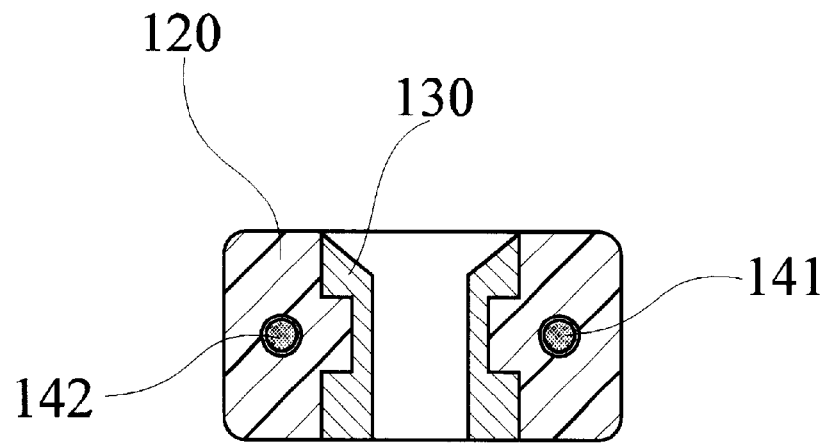
FIG. 2 is a cross section view of the sensor of FIG. 1A taken along the line 2—2.

Eyelet 130 is attached to elastomer 120 during the molding process as shown in FIG. 2.

Figure 3:
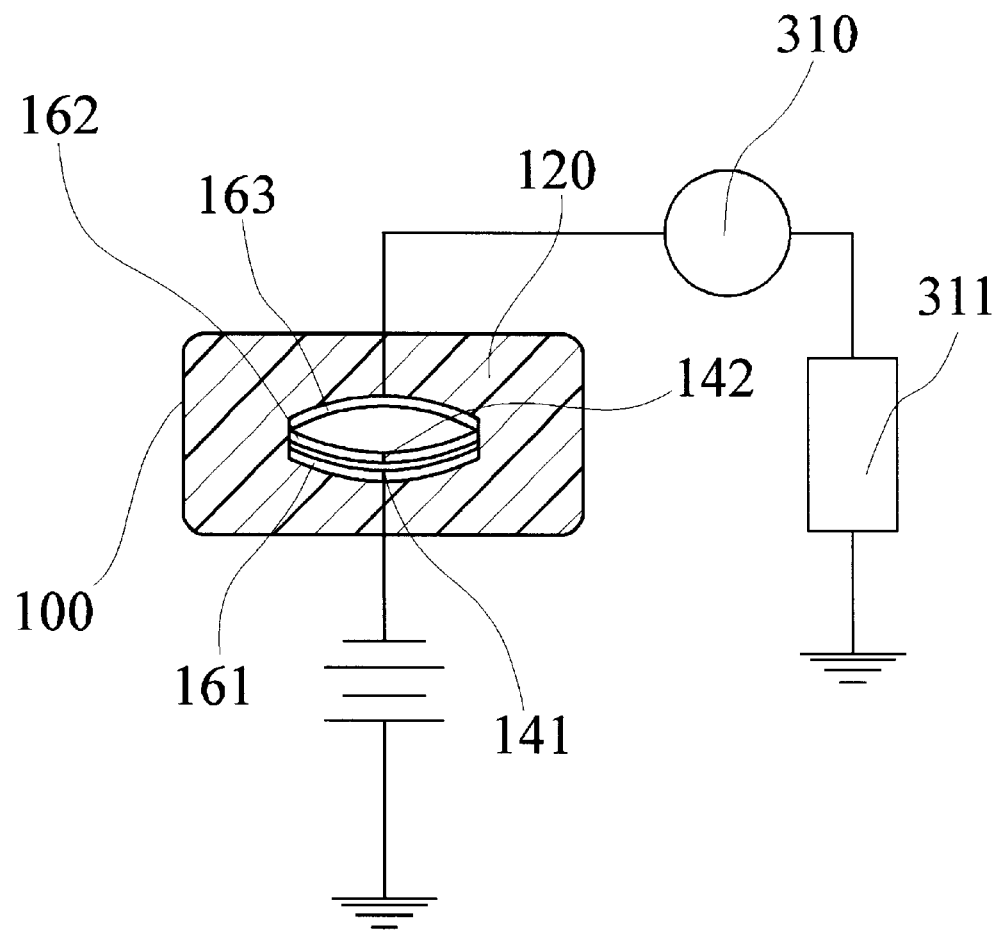
FIG. 3 is a cross section view of the sensor of FIG. 1A taken along the line 3—3 including a schematic of the remainder of the actuating circuit.

A section view through the sensor showing the three metal strips is shown in FIG. 3 where like numbers have the same meaning as in FIGS. 1A and 1B. Also, the attachment of the sensor to the remainder of the circuit is shown schematically where 310 represents the air bag module and 311 an arming sensor which is electrically in series with this crush zone mounted crush switch discriminating sensor.

Figure 4:
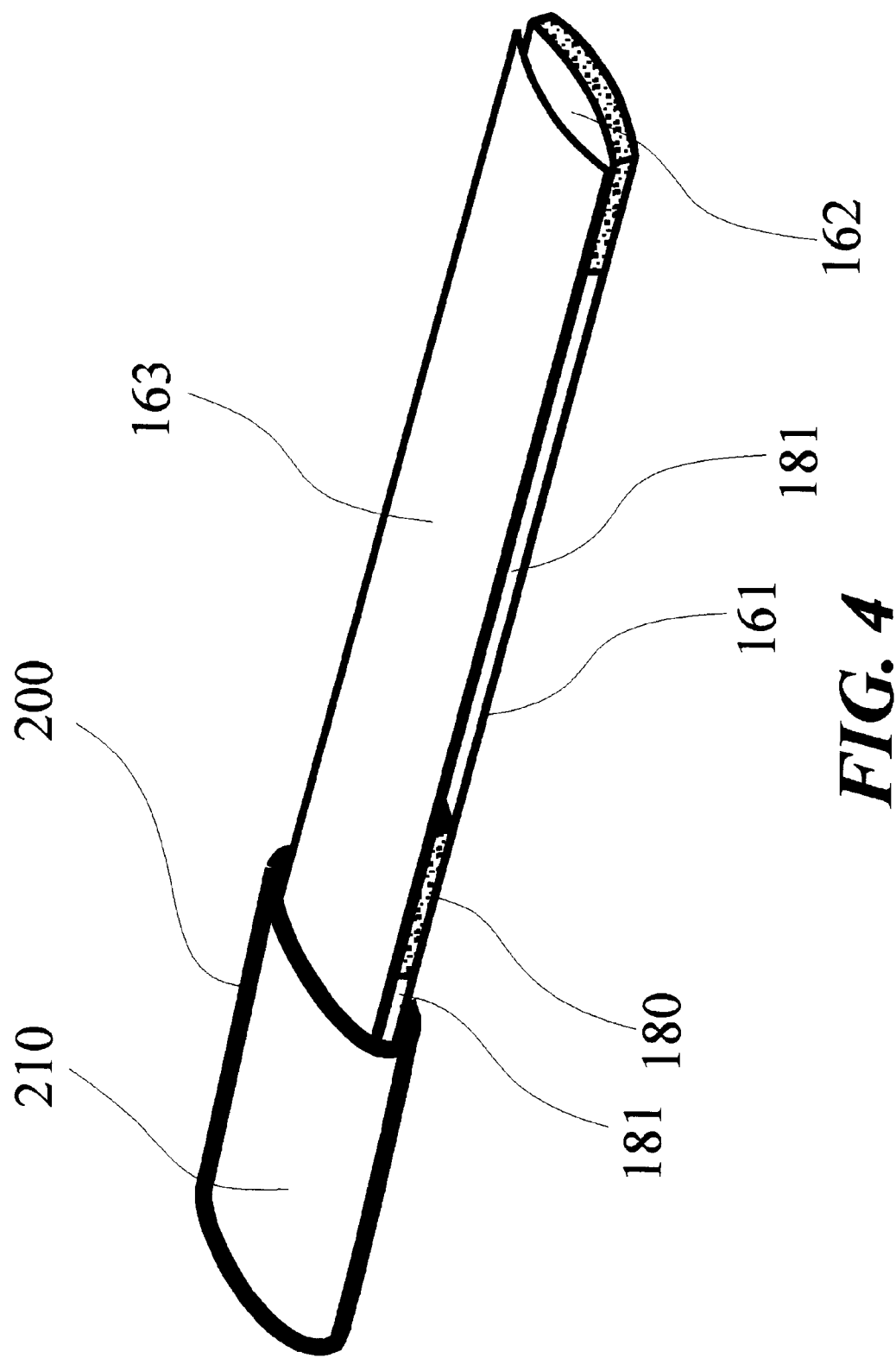
FIG. 4 is a perspective view, with portions cut away, of one embodiment of the flex action tape switch used in the sensor of FIG. 1B.

A perspective view of the tape switch portion of the sensor with certain portions removed is shown generally as 200 in FIG. 4. A protective cover 210, which is normally part of the tape switch, aids in the assembly of the tape switch into the sensor. In a typical manufacturing process, the elastomeric material 120 of FIG. 1A is cast around the tape switch, resistor and wire assembly. The protective cover 210 is heat sealed on both ends of the tape switch and serves to prevent the elastomeric material from flowing into the area of the contacts of the tape switch during the casting process.

A key feature of this embodiment of this invention is the use of a thick elastomeric encapsulation of the tape switch material. This greatly reduces the sensitivity of the tape switch and renders it suitable for use as a crash sensor. The thickness of this elastomeric material can be adjusted to control the sensitivity of the sensor as will be described in more detail below. The protective cover 210 is normally less than about 0.025 inches thick while the elastomeric material is usually at least about 0.1 inch thick. Preferred elastomeric encapsulation materials include polyurethane and silicone rubber although there are other materials that would also be suitable. These materials retain their flexibility to about −40 degrees C. and are usable above about 100 degrees C. making them suitable for this application.

Although the examples shown here employ the combination of a protective cover 210 and elastomeric encapsulation material 120, in some applications it is possible to extrude a thick protective cover and eliminate the elastomeric material 120 entirely. In this case, the mounting can be accomplished by the use of an external bracket.

The contact strips 161 and 162 as shown in FIG. 4 are formed in a concave upward shape and separated by insulator pads 180 to thereby define voids 181 between adjacent insulator pads 180 along the length of the contact strips 161, 162. An additional strip 163 is formed in a concave downward shape and rests on top of contact 162. Strips 161, 162 and 163 could be made from any convenient metal material; however, copper-coated spring steel is preferred. Other suitable materials include beryllium copper or beryllium nickel.

Figure 8:
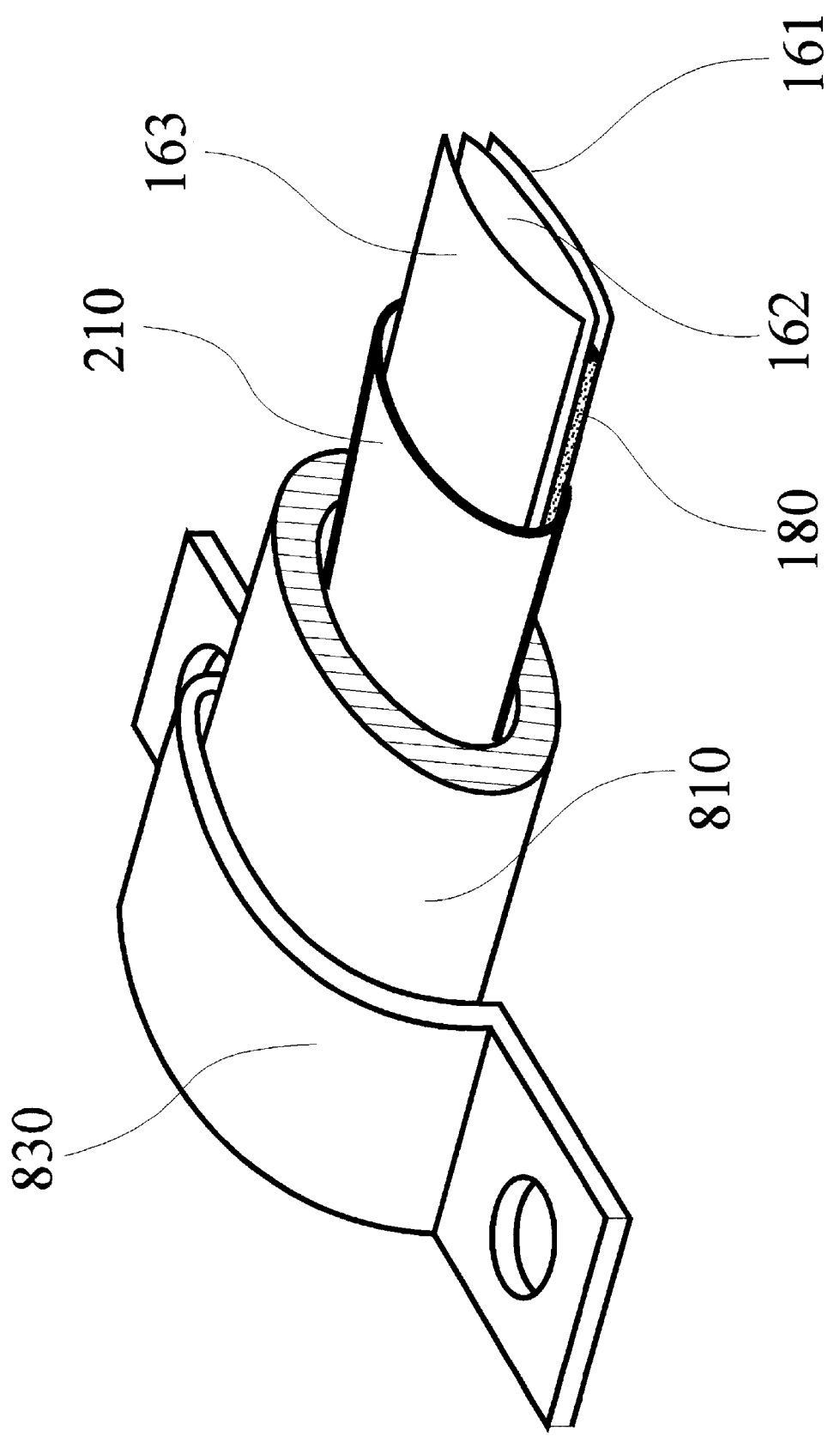
FIG. 8 is a perspective view, with portions cut away, of the flex action tape switch mounted inside of a tube.

Conventional tape switch material is too sensitive to be used by itself if it is exposed and the thick covering is used in this invention to significantly reduce this sensitivity. This could also be accomplished by enclosing the tape switch in a plastic or metal tube or other housing shape that deforms on impact to actuate the tape switch sensor. Such a structure is shown in FIG. 8 where a tube 810 of elliptical cross section performs a similar function as material 120 of FIG. 1A. The tube 810 is attached to the vehicle structure by means of external brackets 830. The protective function provided by this tube 810 could also be incorporated and made a part of the vehicle structure further simplifying the sensor design since one part would now serve two functions.

Figure 10:
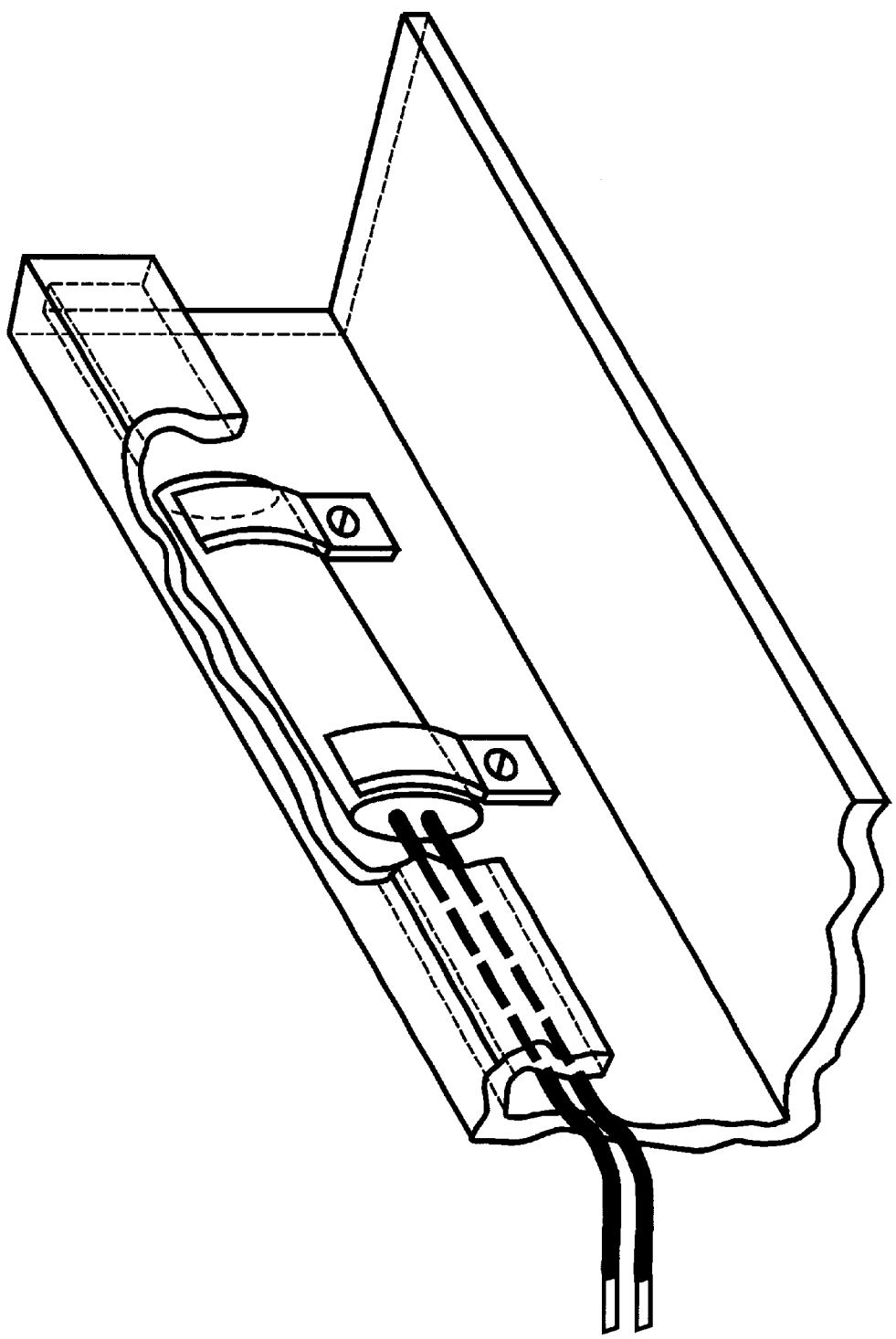
FIG. 10 is a plane view showing a tape switch crush sensor protected by a portion of the vehicle structure with a portion of the structure cut away.

Although a tube of elliptical cross section is shown in FIG. 8, tubes having different and varying cross-sectional shapes would also work. If the tube function is incorporated as part of the vehicle structure, as shown in FIG. 10, it might not totally surround the tape switch as long as it is sufficient to protect the tape switch from inadvertent actuation.

For the purposes of this invention, structure will mean any piece of metal or plastic which is attached and made a part of the vehicle including all sheet metal, supporting metal members, plastic housings or coverings and any items attached to the vehicle including but not limited to the radiator, engine, shock absorbers etc., upon which a crash sensor can be attached or mounted.

Figure 5:
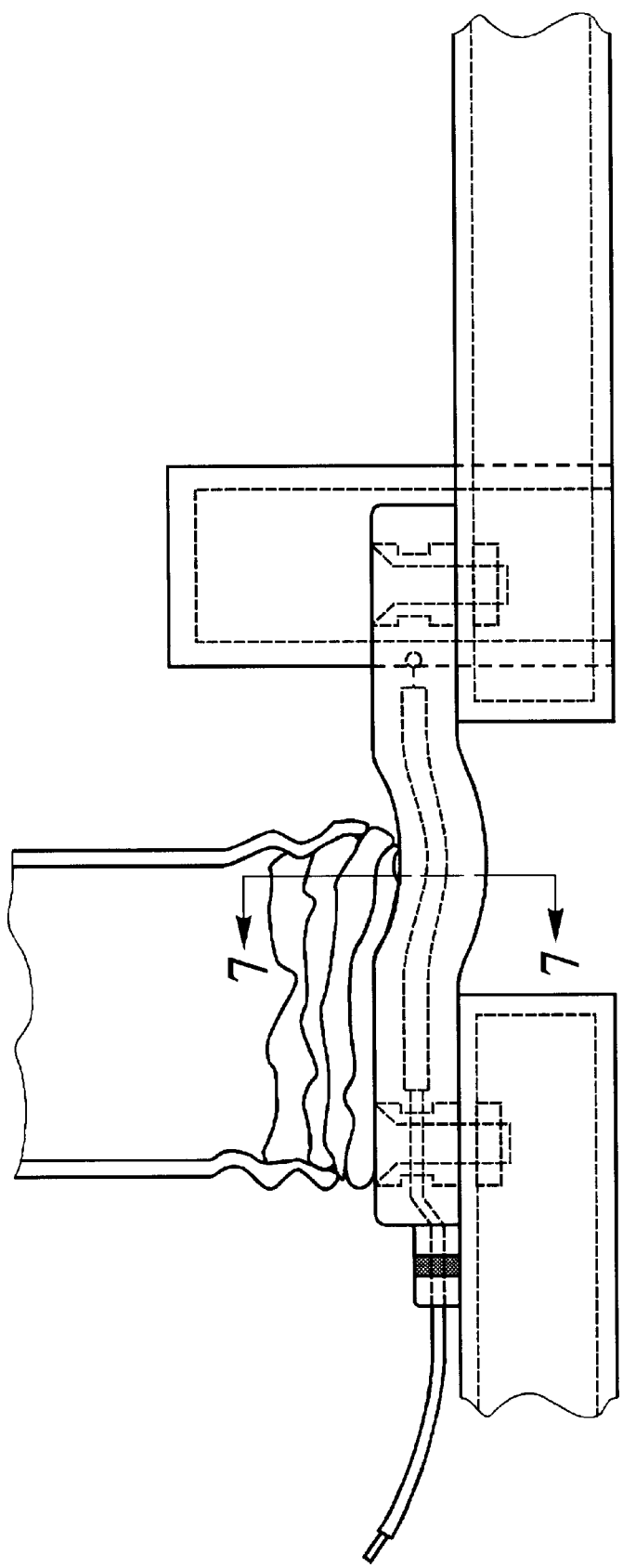
FIG. 5 is a plane view of the sensor as shown in FIG. 1B with the sensor in the actuating condition upon being impacted by crushed material in a crash.
Figure 6:
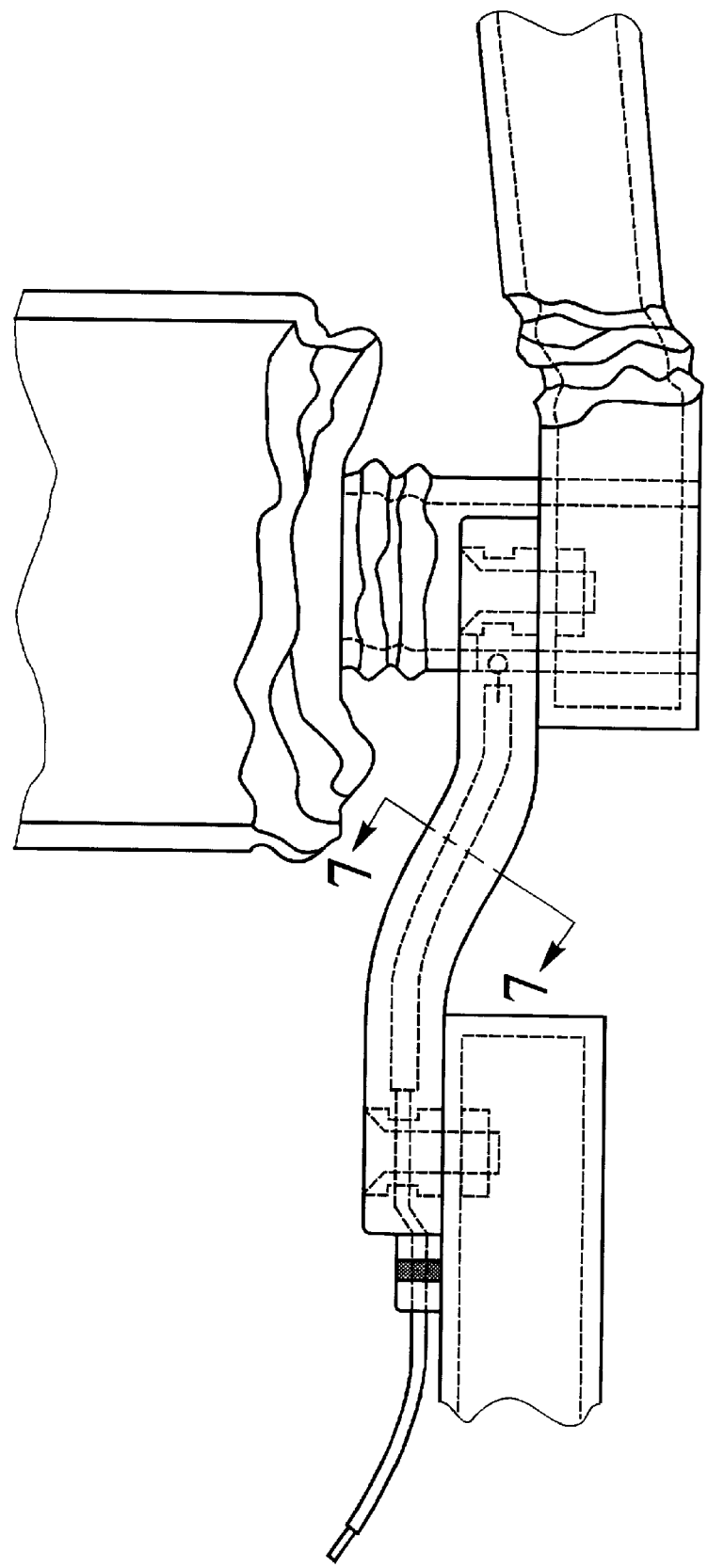
FIG. 6 is a plane view of the sensor as shown in FIG. 1B with the sensor in the actuating condition upon being bent along with the structure on which the sensor is mounted during a crash.
Figure 7:
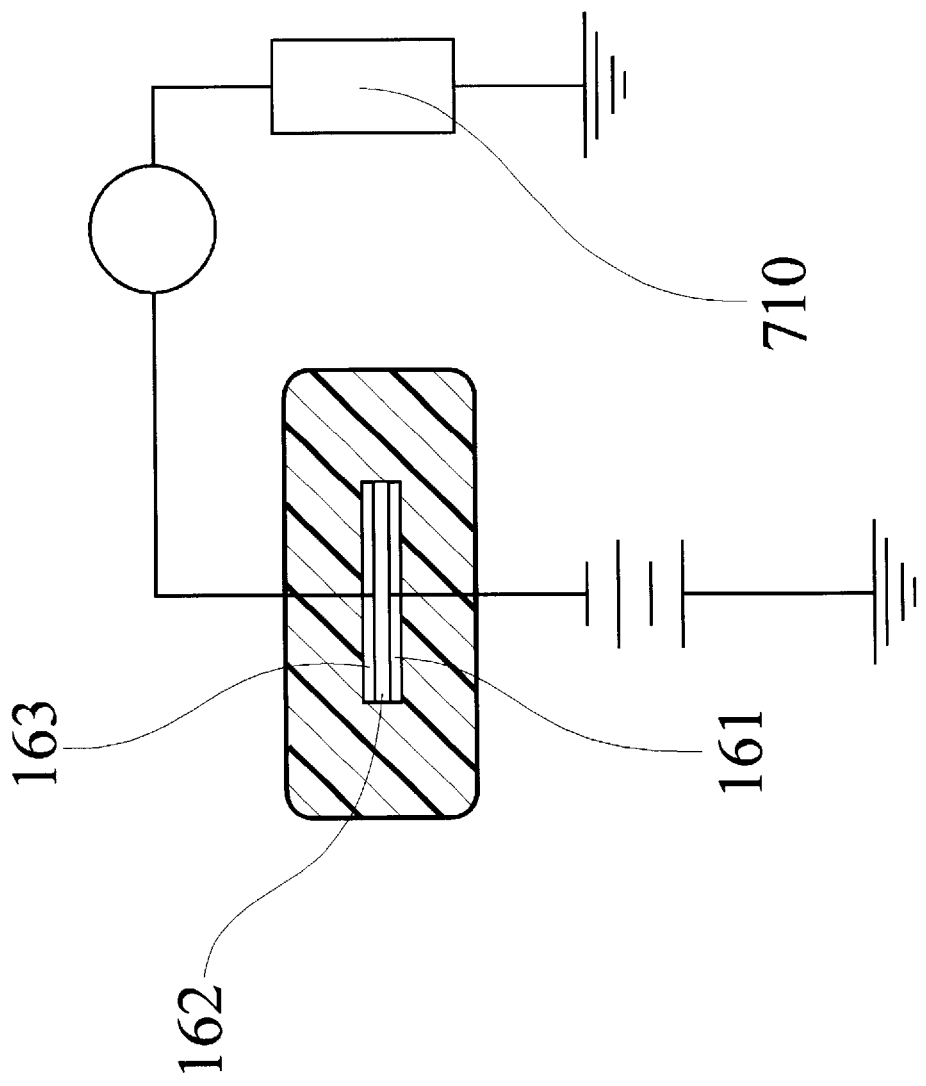
FIG. 7 is a cross section view of FIG. 5 or FIG. 6 taken along the line 7—7 also including a schematic of the remainder of the actuating circuit.

The switch can be activated by a pressure at any point between the insulator pads 180, as shown in FIG. 5, which causes the contact strip 161 to bend and touch contact strip 162 as shown in FIG. 7. In addition, when the switch is bent, as shown in FIG. 6, contacts strips 161 and 162, and strip 163 resist the bending force until this force becomes sufficient to cause all three of the strips to become flat at one point along the tape switch as shown in FIG. 7. This flattening occurs between the insulator pads 180, and causes contact strips 161 and 162 to touch completing an electrical circuit. This particular configuration renders this tape switch responsive to bending, as shown in FIG. 6. In contrast, normal tape switches do not close if bent but will do so only by an externally applied force.

This switch is also tolerant of particles that might lodge between the contact strips. In this case the flat area of contact moves slightly to a place where no particle exists. This feature greatly enhances the reliability of the sensor and eliminates the need for bifurcation of the contacts which is usually done to achieve the desired reliability. Alternately, portions of the surface of one of the contract strips can be deformed with ridges, for example, to enhance the contact forces.

The bending moment required to cause switch actuation in bending is partially determined by the thickness of strip 163. If this strip is made thick, a greater force is required to cause switch closure. The sensitivity of the sensor to pressure can be adjusted by the thickness and the durometer of elastomer 120. Thus, by varying the properties of elastomer 120 and the strip 163, a wide range of sensor sensitivity values can be achieved to permit discrimination between maintenance, road stone impacts or other abusive treatment of the sensor and an automobile crash. In some cases, only two metal contact strips, 161 and 162, are present and the sensitivity can be adjusted by varying the thickness of one or both of these two strips. The presence of the third strip 163 helps assure that the sensor will close on bending. If strip 163 is not present, the ends of contact strips 161 and 162 must be held so that they will not move relative to each other in order to assure closure on bending alone. The bending angle required to cause the sensor to close is determined partially by the curvature of the metal strips and by the thickness of the insulating pads which cause the separation between the contact strips. These can also be adjusted by trial and error or by those experienced in the art. In another configuration, the insulating pads are replaced by ridges molded is part of the protective cover which holds the pads apart.

For most applications, the sensors of this invention are used in parallel with a discriminating sensor mounted in the passenger compartment if one is present. An alternative strategy, as shown schematically in FIG. 7, is also possible where the crush sensor is used in series with a non-crush zone discriminating sensor 710 (which may be arranged to trigger based on a reaction of the entire vehicle or a part thereof to the crash, e.g., velocity change and/or acceleration, or functions thereof). In this case, the non-crush zone sensor 710 could be made more sensitive and would trigger earlier in certain crashes. It would not be as sensitive as an arming sensor which triggers on as little as one MPH. For the purposes herein, a non-crush zone discriminating sensor is defined as a sensor which will not trigger, or close an electric circuit, on a 5 MPH barrier crash but will close at some higher speed barrier crash. Normally, a non-crush zone discriminating sensor will require at least an 8 MPH barrier crash to close. Here, however, since it is to be used in series with a crush zone discriminating sensor, it can be made more sensitive so that it will trigger in time on many softer crashes. This arrangement could eliminate the need for a safing or arming sensor and would permit discrimination on high speed animal impacts where deployment of the restraint system is not desired. This strategy is made possible by virtue of the latching action of the crush switch sensor of this invention. Alternatively, this latching function can be accomplished in software or hardware within the non-crush zone sensor electronics module or even in the crush zone sensor package regardless of its design. In some electromechanical crush zone sensors, such as the ball-in-tube sensors of current design, sufficient contact closure cannot be guaranteed to assure simultaneous closure with the passenger compartment mounted discriminating sensor 710 and an external latching circuit may be required.

From the foregoing, it should be appreciated that a crush zone discriminating sensor used in the embodiment shown schematically in FIG. 7 is not required to be constructed to trigger based on crush of the crush zone of the vehicle as shown but rather, can in the alternative be designed to trigger based on other reactions of the crush zone to a crash, including the velocity change of the crush zone and the acceleration of the crush zone, as well as functions thereof (and combinations of any such reactions). The crush zone discriminating sensor is however mounted in the crush zone.

The one type of common crash which can defeat most crush zone sensors, is a high speed impact with an animal, such as a deer, where the sensor is directly impacted by the animal since he usually impacts the vehicle above the bumper. Typically, the total velocity change for this type of crash is less than 4 MPH. Normally, it is not possible to rely on the overlap of two discriminating sensors located at different points in the vehicle since a minimum contact closure duration for inertial type sensors cannot be guaranteed. For the tape switch sensor of the present invention, the contacts, once they close, will remain closed or latched until the vehicle is repaired or a wire is cut, as mentioned above. Naturally, other latching systems would also perform this function and permit the use of other crush zone sensor designs. This feature, then, permits the discrimination on the deer impact even though the crush zone sensor might close.

This is the first use of an electromechanical crash sensor which latches closed during a crash, or of a sensor of any type for that matter. Normally, crash sensors must be tested during manufacture and therefore must reset themselves after each test. The tape switch sensor of this invention can also be tested prior to mounting on the vehicle and even after it has been mounted. After such testing it also resets itself During a crash, however, it latches since the material on which it is mounted is permanently deformed. This fact permits the use of a crush zone sensor in series with a passenger compartment discriminating sensor, as shown in FIG. 7, to achieve a higher level of crash discrimination. Other sensor designs which can also be made to latch will now become obvious.

Figure 9:
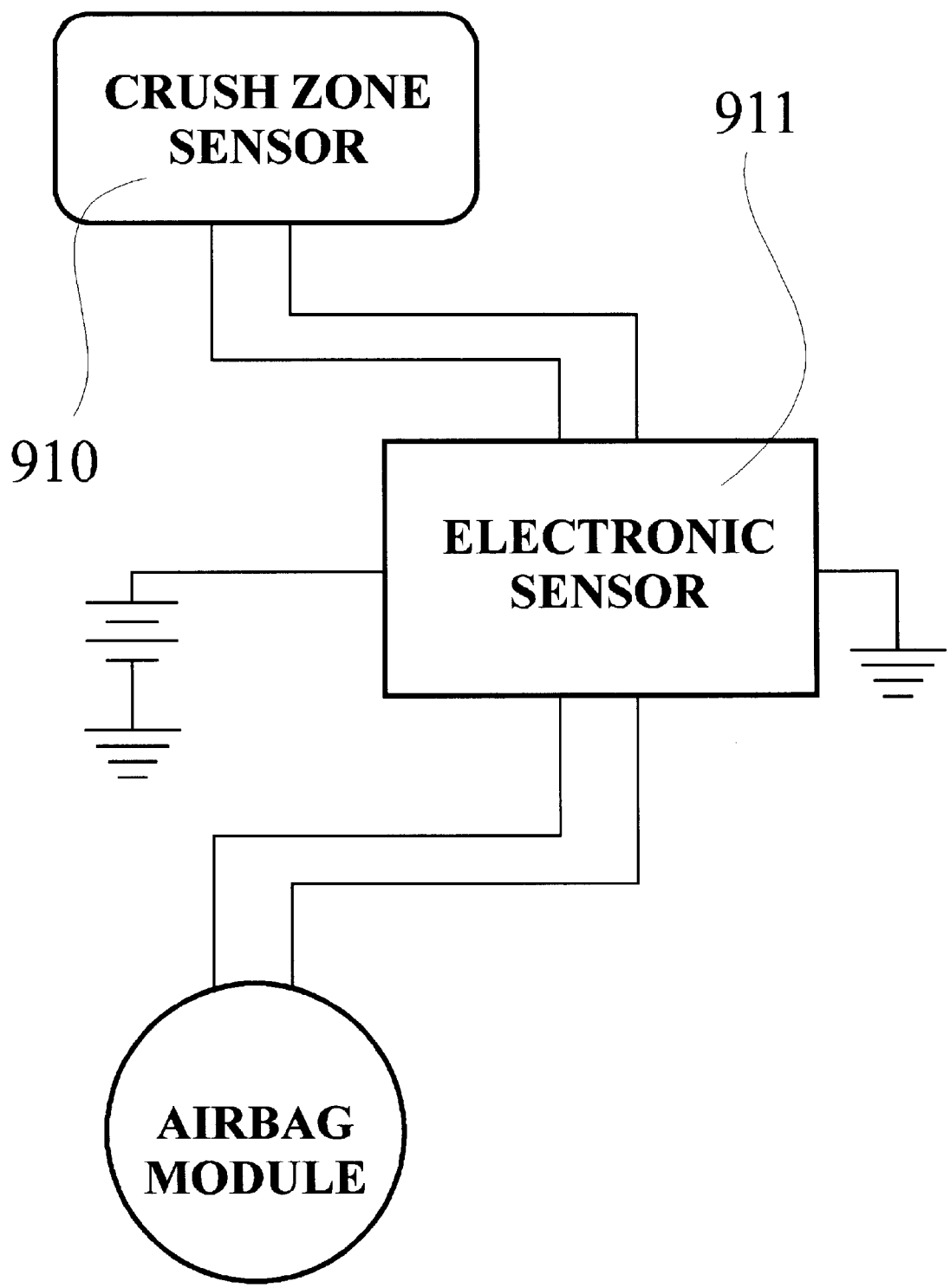
FIG. 9 is a circuit schematic showing a forward mounted sensor used as an input to an electronic sensor.

If the passenger compartment discriminating sensor is of the electronic type, the triggering threshold can be changed based on the condition of the sensor in the crush zone. Passenger compartment sensors sometimes trigger late on soft long duration crashes even though the velocity change is significantly higher than the desired deployment threshold. See for example, Breed, D. S. and Castelli, V. Are Barrier crashes Sufficient for Evaluating Air Bag Sensor Performance?, SAE Paper 900548. In such a case, the fact that the sensor has triggered can be used to modify the velocity change, or other parameters, required for the electronic sensor to trigger. Thus, in one case, the passenger compartment sensor can prevent the deployment of the air bag when the velocity change is too low as in the animal impact and in the second case, the crush zone sensor can cause the discriminating sensor to trigger faster in a soft crash and minimize the chance of a late triggering condition where the occupant is out of position and in danger of being injured by the deploying air bag. FIG. 9 shows schematically such a circuit where an electronic sensor 911 triggers deployment of the air bag and crush zone sensor 910 is used as input to the electronic sensor. In this case, the current carrying capacity of the crush zone sensor can be much less and thinner wires can be used to connect it to the electronic sensor. In one scenario, the electronic sensor may be monitoring a crash in progress when suddenly the front crush zone sensor signals that the vehicle has crushed up to where the sensor is mounted. The electronic sensor now realizes that this is a soft, deep penetration crash which requires an air bag according to a modified algorithm. The conditions for deploying the air bag can be modified based on this crush information. In this manner, the combined system can be much smarter than either sensor acting alone. A low speed offset pole or car-to-car underride are common real world examples where the electronic sensor in the passenger compartment might trigger late without the information provided by the forward mounted crush zone sensor.

The crush zone sensor 910 can detect a reaction of the crush zone to the crash, e.g., crush of the crush zone, a velocity change of the crush zone or acceleration of the crush zone. That is, sensor 910 does not necessarily have to be one of the crush sensors disclosed above (or another sensor which triggers based on crush of the crush zone of the vehicle) but rather, can be designed to trigger based on other reactions of the crush zone to a crash, including the velocity change of the crush zone and the acceleration of the crush zone, as well as functions thereof (and combinations of any such reactions).

Figure 9A:
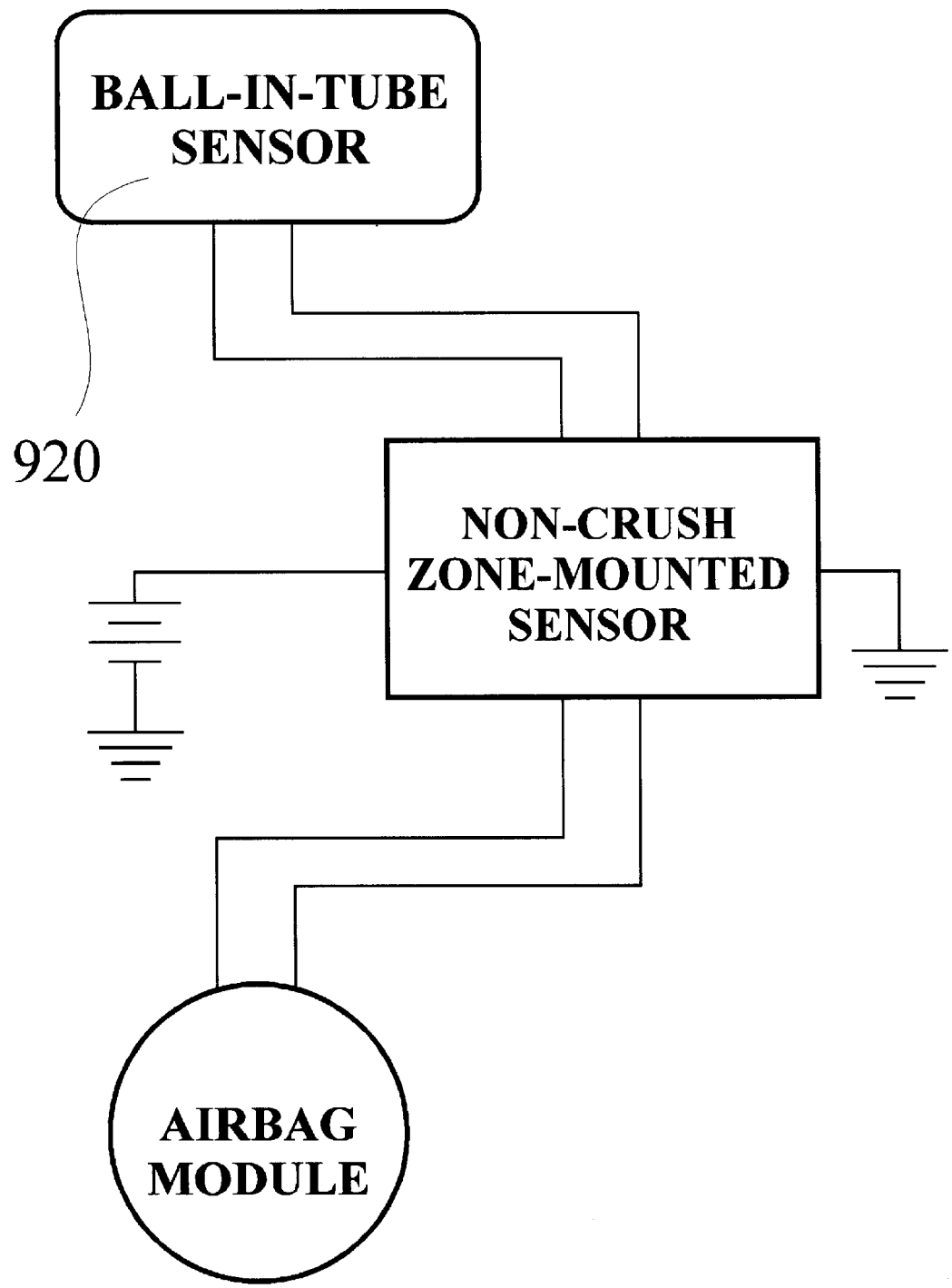
FIG. 9A is a circuit schematic showing a forward mounted ball-in-tube sensor used as input to a deceleration-sensing crash sensor mounted outside of the crush zone.
Figure 9B:
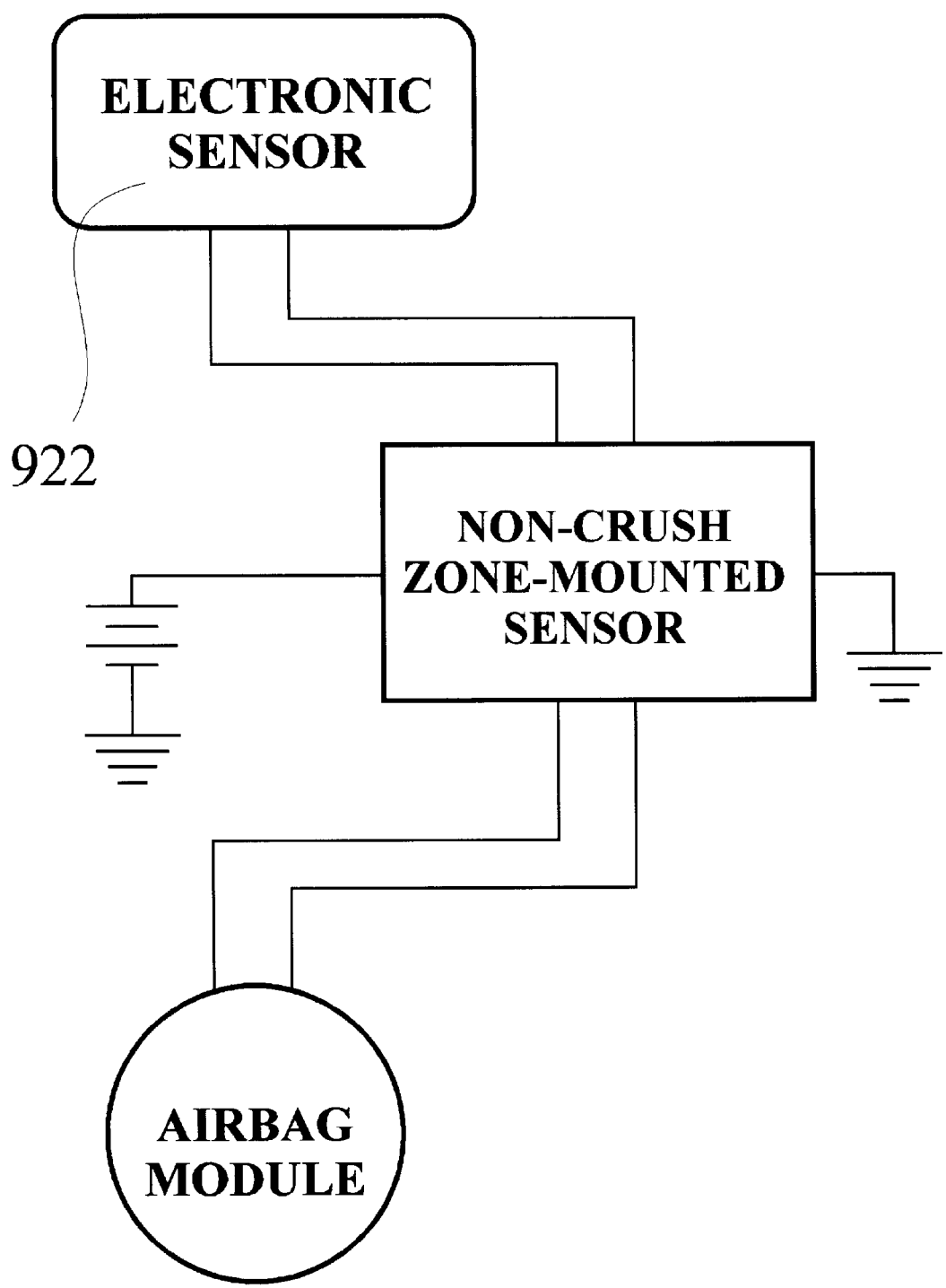
FIG. 9B is a circuit schematic showing a forward mounted electronic sensor used as input to a deceleration-sensing crash sensor mounted outside of the crush zone.

FIG. 9A shows a schematic circuit of an arrangement in accordance with the invention with a ball-in-tube sensor 920 as the crush zone sensor and FIG. 9B shows a schematic circuit of an arrangement in accordance with the invention with an electronic sensor 922 as the crush zone sensor.

Rotation of crush zone sensors is a very common problem experienced especially in low speed and angular car to car crashes and in low pole impacts. In one example, the crush zone sensor moved 6 inches toward the rear of the vehicle while it was sensing and integrating the crash. If this sensor rotated during this motion, it might not trigger and the air bag would not be deployed. Frequently, the crushing mode of the front of the vehicle is such that the material moves rearward in the vehicle and strikes the sensor on an angle. When this happens, the crush zone sensor can rotate early in the crash and therefore be unable to sense and properly integrate the longitudinal acceleration. In such a case, the sensor may fail to trigger or trigger late. The crush sensor of this invention, as depicted in FIG. 1A, is designed to eliminate this problem since the sensor is attached to a portion of the vehicle which is known to deform in all air bag desired crashes. It is therefore not effected by rotation except that such forces would probably enhance sensor triggering.

In order to prevent seismic sensors from rotating in a crash, it has become common to increase the strength of the radiator support or other structure on which the sensor is mounted. The sensor mounting bracket, however, must then permit the sensor to move relative to this structure complicating the bracket design or this structure must be weakly attached to the remainder of the vehicle so that the whole assembly will move in the crash. This added structural strength adds weight to the vehicle and is not needed for the sensor of this invention. It is even desirable for the sensor of this invention to be mounted on weaker structural members in order to enhance the chance for the structure to deform especially in soft crashes. The use of the tape switch sensor of this invention, therefore, results in a weight saving for the vehicle which is very important with the increasingly stringent fuel economy standards mandated by the U. S. Government.

Operation of the crush zone crash sensor of this invention, as well as all others, can be critically affected by the material which is located between the sensor and the front of the vehicle and the geometry of this material as it crushes and comes back to strike the sensor. The sensors of the present invention are considerably more tolerant to variations in the geometry of this material for two reasons. Considering the compression mode, the length of the sensor can be increased so that the probably of it being impacted is very high. Alternately, in the bending mode, the sensor can be attached to two portions of the vehicle which are likely to experience relative motion during the crash. In this latter case, the two portions of the vehicle effectively become extensions of the sensor. In some cases, the radiator support structure is designed so that it will always deform at a particular location with the result that the sensor can be quite short since the entire radiator structure becomes an extension of the sensor. In other cases, such a location is not readily available and the sensor must be made longer to guarantee that it will be bent or compressed in a crash by crushed material coming from areas further forward in the vehicle.

The use of crush initiators is becoming increasingly common in vehicle design. These usually take the form of a hole, wrinkle, notch or bend intentionally placed in a structural member to cause the member to bend in a particular manner during a crash. As the sensor of the present invention is adapted to a particular vehicle, the use of crush initiators to control the manner in which the member, on which the sensor is mounted, bends will result in a shorter and more reliable sensor. Additional, usually minor, design modifications can also be used to permit the sensor to be mounted in protected locations so as to minimize the chance of sensor damage during vehicle maintenance.

The force required to cause sensor closure is an important design parameter of the sensor of this invention. In one typical design configuration, a 20 pound force on the sensor is required to move the front contact strip toward the rear member sufficiently to cause sensor closure in the compression mode. This force is sufficient so that it is unlikely for the sensor to inadvertently close during vehicle maintenance, stone and some animal impacts and yet this force is quite low compared to the forces typically experienced during even marginal crashes.

The angle required to cause sensor closure is also an important parameter of the sensor of this invention. In one typical design configuration, a 15 degree bend angle of the sensor is required to move the front contact strip toward the rear member sufficiently to cause sensor closure in the bending mode. This angle is sufficient so that it is unlikely for the sensor to inadvertently close during vehicle maintenance, stone and some animal impacts and yet this angle is quite low compared to the relative displacements and the angles that will occur in a sensor mounted on two locations which typically move relative to each other in even marginal crashes.

As can be appreciated from the above discussion, all of the objects of this invention have been effectively attained in an extremely simple device. Although several somewhat preferred embodiments have been disclosed and described in detail herein, it should be understood that this invention is in no sense limited thereby and its scope is to be determined by that of the appended claims.

I claim:

1. A vehicle having an occupant restraint device and a portion defined as a crush zone which is designed to crush upon a crash involving the vehicle, the vehicle including a crash sensor arrangement for determining whether the crash involving the vehicle requires deployment of the occupant restraint device, the arrangement consisting of:

a first discriminating crash sensor mounted in the crush zone of the vehicle and structured and arranged to trigger based on a reaction of the crush zone to the crash, and a second discriminating crash sensor mounted outside of the crush zone of the vehicle and structured and arranged to trigger by means other than crush of the crush zone of the vehicle, said first and second discriminating sensors being coupled to one another such that the occupant restraint device is deployable when only one of said first sensor and said second sensor has triggered.

2. The vehicle of claim 1, wherein the reaction of the crush zone to the crash upon which said first discriminating crash sensor is structured and arranged to trigger is crush of the crush zone.

3. The vehicle of claim 1, wherein the reaction of the crush zone to the crash upon which said first discriminating crash sensor is structured and arranged to trigger is at least one of displacement of the crush zone during the crash, a velocity change of the crush zone during the crash and acceleration of the crush zone during the crash.

4. The vehicle of claim 1, wherein said second discriminating sensor is arranged to receive a signal indicative of triggering of said first sensor, consider whether an algorithm or triggering criteria which determines triggering of said second discriminating sensor should be modified based on the signal indicative of triggering of said first sensor and if so, modify the algorithm or triggering criteria.

5. The vehicle of claim 1, wherein said second discriminating sensor is arranged to receive a signal indicative of triggering of said first discriminating sensor, consider whether its sensitivity to trigger should be modified based on the signal indicative of triggering of said first sensor and if so, modify its sensitivity.

6. The vehicle of claim 1, wherein said second discriminating sensor is arranged to trigger based on a reaction of the entire vehicle or a part of the vehicle other than the crush zone of the vehicle to the crash.

7. The vehicle of claim 1, wherein said second discriminating sensor is a discriminating electronic sensor arranged to trigger based on at least one of acceleration of the vehicle and a change in velocity of the vehicle.

8. The vehicle of claim 7, wherein said second discriminating sensor is arranged to receive a signal indicative of triggering of said first discriminating sensor and modify the at least one of the acceleration velocity change required for triggering based on the triggering of said first discriminating sensor.

9. The vehicle of claim 1, wherein said second discriminating sensor is mounted in association with the passenger compartment of the vehicle.

10. The vehicle of claim 1, wherein said first and second discriminating sensors have different sensitivities to crashes.

11. The vehicle of claim 1, wherein said second discriminating sensor is more sensitive to crashes than said first sensor.

12. The vehicle of claim 1, wherein said first discriminating sensor is a crush switch crush sensor.

13. The vehicle of claim 1, wherein said first discriminating sensor is a ball-in-tube crash sensor.

14. The vehicle of claim 1, wherein said first discriminating sensor is an electronic crash sensor.

15. The vehicle of claim 1, wherein said first discriminating crash sensor comprises
   a crush switch including first and second electrically conductive members spaced apart from one another, said first member and said second member coming into contact with one another upon exertion of a sufficient force caused by crush of the vehicle to thereby cause triggering of said crush switch.

16. The vehicle of claim 1, wherein said first discriminating sensor is structured and arranged to latch closed upon a crash of the vehicle causing triggering of said first discriminating sensor.

17. A vehicle having an occupant restraint device and a portion defined as a crush zone which is designed to crush upon a crash involving the vehicle, the vehicle including a crash sensor arrangement for determining whether the crash involving the vehicle requires deployment of the occupant restraint device, the arrangement comprising
   a first discriminating crash sensor mounted outside of the crush zone of the vehicle and structured and arranged to trigger by means other than crush of the crush zone of the vehicle, and
   a second discriminating crash sensor coupled to said first sensor and mounted in the crush zone of the vehicle, said second sensor being structured and arranged to provide information about a reaction of the crush zone to the crash to said first sensor,
   said first discriminating sensor being arranged to receive the information about the reaction of the crush zone of the vehicle to the crash from said second discriminating sensor, consider whether triggering of said first discriminating sensor should be modified based on the information about the reaction of the crush zone of the vehicle to the crash provided by said second discriminating sensor and if so, modify triggering of said first sensor.

18. The vehicle of claim 17, wherein the reaction of the crush zone to the crash upon which said second discriminating crash sensor provides information is crush of the crush zone.

19. The vehicle of claim 17, wherein the reaction of the crush zone to the crash upon which said second discriminating crash sensor provides information is at least one of displacement of the crush zone during the crash, a velocity change of the crush zone during the crash and acceleration of the crush zone during the crash.

20. The vehicle of claim 17, wherein said first discriminating sensor considers whether to modify its sensitivity based on the information about the reaction of the crush zone of the vehicle to the crash provided by said second discriminating sensor.

21. The vehicle of claim 17, wherein said first discriminating sensor is arranged to trigger based on a reaction of the entire vehicle or a part of the vehicle other than the crush zone of the vehicle to the crash.

22. The vehicle of claim 17, wherein said first discriminating sensor is a discriminating electronic sensor arranged to trigger based on at least one of acceleration of the vehicle and a change in velocity of the vehicle.

23. The vehicle of claim 22, wherein said first discriminating sensor is structured and arranged to consider whether the at least one of the acceleration and velocity change required for triggering should be modified based on the information about the reaction of the crush zone of the vehicle to the crash provided by said second discriminating sensor and if so, modify the triggering requirements.

24. The vehicle of claim 17, wherein said second discriminating sensor is a crush switch crush sensor.

25. A method for determining whether the crash involving the vehicle requires deployment of an occupant restraint device, the vehicle having a portion defined as a crush zone which is designed to crush upon a crash involving the vehicle, the method consisting of the steps of:
   mounting a first crash discriminating sensor in the crush zone of the vehicle, the first discriminating sensor being triggered based on a reaction of the crush zone of the vehicle to the crash,
   mounting a second crash discriminating sensor outside of the crush zone of the vehicle, the second discriminating sensor being triggered by means other than crush of the crush zone of the vehicle, and
   enabling deployment of the occupant restraint device when only one of the first discriminating sensor and the second discriminating sensor has triggered.

26. The method of claim 25, wherein the reaction of the crush zone to the crash upon which the first discriminating crash sensor is triggered is crush of the crush zone.

27. The method of claim 25, wherein the reaction of the crush zone to the crash upon which the first discriminating crash sensor is triggered is at least one of displacement of the crush zone during the crash, a velocity change of the crush zone during the crash and acceleration of the crush zone during the crash.

28. The method of claim 25, further comprising the steps of:
   directing a signal indicative of triggering of the first discriminating sensor to the second discriminating sensor,
   considering whether the conditions for triggering of the second discriminating sensor should be modified based on the triggering of the first discriminating sensor, and if so,
   modifying the conditions for triggering of the second discriminating sensor.

29. The method of claim 25, wherein the second discriminating sensor is an electronic discriminating sensor arranged to trigger based on at least one of a change in velocity of the vehicle and acceleration of the vehicle, further comprising the steps of:
   directing a signal indicative of triggering of the first discriminating sensor to the second discriminating sensor,
   considering whether the at least one of the velocity change and acceleration required for triggering of the second discriminating sensor should be modified based on the triggering of the first discriminating sensor, and if so, modifying the triggering requirements.

30. The method of claim 25, further comprising the step of:

providing the first and second discriminating sensors with different sensitivities to crashes.

31. The method of claim 25, further comprising the step of:

causing the first discriminating sensor to latch closed upon crush of the vehicle causing triggering of the first discriminating sensor.

32. A method for determining whether a crash involving a vehicle requires deployment of an occupant restraint device, the vehicle having a portion defined as a crush zone which is designed to crush upon a crash involving the vehicle, the method comprising the steps of:

mounting a first discriminating crash sensor outside of the crush zone of the vehicle, the first sensor being triggered to deploy the occupant restraint device by means other than crush of the crush zone of the vehicle, and mounting a second crash sensor in the crush zone of the vehicle such that the second sensor generates information about a reaction of the crush zone of the vehicle to a crash, providing the information about the reaction of the crush zone of the vehicle to the crash from the second sensor to the first sensor, and controlling deployment of the occupant restraint device via the first descrimination sensor based on the information about the reaction of the crush zone of the vehicle to the crash provided by the second sensor.

33. The method of claim 32, wherein the reaction of the crush zone to the crash upon which the second crash sensor generates information is crush of the crush zone.

34. The method of claim 32, wherein the reaction of the crush zone to the crash upon which the second crash sensor generates information is at least one of displacement of the crush zone during the crash, a velocity change of the crush zone during the crash and acceleration of the crush zone during the crash.

35. The method of claim 32, wherein the step of controlling deployment of the occupant restraint device via the first discriminating sensor comprises the steps of:

considering whether an algorithm or parameters which determines triggering of the first discriminating sensor should be modified based on the information about crush of the vehicle provided by the second sensor, and if so modifying the algorithm or parameters.

36. The method of claim 32, wherein the first discriminating sensor is an electronic sensor arranged to trigger based on at least one of acceleration of the vehicle and a change in velocity of the vehicle.

37. The method of claim 36, wherein the step of controlling deployment of the occupant restraint device comprises the steps of:

considering whether the at least one of the acceleration and velocity change required for triggering of the first discriminating sensor should be modified based on the information about crush of the vehicle provided by the second sensor, and if so, modifying the triggering requirements.

38. The method of claim 32, wherein the information about the reaction of the crush zone of the vehicle to the crash generated by the second sensor is an indication of the amount of crush of the second sensor.

39. A vehicle having an occupant restraint device and a portion defined as a crush zone which is designed to crush upon a crash involving the vehicle, the vehicle including a crash sensor arrangement for determining whether the crash involving the vehicle requires deployment of the occupant restraint device, the arrangement comprising a first crash sensor mounted in the crush zone of the vehicle and structured and arranged to measure a reaction of the crush zone to the crash, and a second crash sensor mounted outside of the crush zone of the vehicle and structured and arranged to trigger by means other than crush of the crush zone of the vehicle, said first and second sensors being coupled to one another such that a signal to deploy the occupant restraint device is generated in consideration of the measured reaction of the crush zone to the crash and whether said second sensor has triggered, said second sensor being arranged to receive a signal indicative of the measured reaction of the crush zone to the crash by said first sensor, consider whether an algorithm or triggering criteria which determines triggering of said second sensor should be modified based on the signal and if so, modify the algorithm or triggering criteria.

40. A vehicle having an occupant restraint device and a portion defined as a crush zone which is designed to crush upon a crash involving the vehicle, the vehicle including a crash sensor arrangement for determining whether the crash involving the vehicle requires deployment of the occupant restraint device, the arrangement comprising a first crash sensor mounted in the crush zone of the vehicle and structured and arranged to measure a reaction of the crush zone to the crash, and a second crash sensor mounted outside of the crush zone of the vehicle and structured and arranged to trigger by means other than crush of the crush zone of the vehicle, said first and second sensors being coupled to one another such that a signal to deploy the occupant restraint device is generated in consideration of the measured reaction of the crush zone to the crash and whether said second sensor has triggered, said second sensor being arranged to receive a signal indicative of the measured reaction of the crush zone to the crash by said first sensor, consider whether its sensitivity to trigger should be modified based on the signal and if so, modify its sensitivity.

41. A vehicle having an occupant restraint device and a portion defined as a crush zone which is designed to crush upon a crash involving the vehicle, the vehicle including a crash sensor arrangement for determining whether the crash involving the vehicle requires deployment of the occupant restraint device, the arrangement comprising a first crash sensor mounted in the crush zone of the vehicle and structured and arranged to measure a reaction of the crush zone to the crash, and a second crash sensor mounted outside of the crush zone of the vehicle and structured and arranged to trigger by means other than crush of the crush zone of the vehicle, said second sensor being a discriminating electronic sensor arranged to trigger based on at least one of acceleration of the vehicle and a change in velocity of the vehicle, said first and second sensors being coupled to one another such that a signal to deploy the occupant restraint device is generated in consideration of the measured reaction of the crush zone to the crash and whether said second sensor has triggered, said second sensor being arranged to receive a signal indicative of the measured reaction of the crush zone to the crash by said first sensor and modify the at least one of the acceleration and velocity change required for triggering based on the measured reaction of the crush zone to the crash.

42. A method for determining whether the crash involving the vehicle requires deployment of an occupant restraint device, the vehicle having a portion defined as a crush zone which is designed to crush upon a crash involving the vehicle, the method comprising the steps of:

mounting a first crash sensor in the crush zone of the vehicle, measuring a reaction of the crush zone to the crash by means of the first sensor, mounting a second sensor outside of the crush zone of the vehicle, the second sensor being triggered by means other than crush of the crush zone of the vehicle, directing a signal indicative of the measured reaction of the crush zone to the crash to the second sensor, considering whether the conditions for triggering of the second sensor should be modified based on the measured reaction of the crush zone to the crash, and if so, modifying the conditions for triggering of the second sensor, and deploying the occupant restraint device in consideration of the measured reaction of the crush zone to the crash and whether the second sensor has triggered.

43. A method for determining whether the crash involving the vehicle requires deployment of an occupant restraint device, the vehicle having a portion defined as a crush zone which is designed to crush upon a crash involving the vehicle, the method comprising the steps of:

mounting a first crash sensor in the crush zone of the vehicle, measuring a reaction of the crush zone to the crash by means of the first sensor, mounting a second crash sensor outside of the crush zone of the vehicle, the second sensor being triggered by means other than crush of the crush zone of the vehicle, the second sensor being an electronic discriminating sensor arranged to trigger based on at least one of a change in velocity of the vehicle and acceleration of the vehicle, directing a signal indicative of the measured reaction of the crush zone to the crash from the first sensor to the second sensor, considering whether the at least one of the velocity change and acceleration required for triggering of the second sensor should be modified based on the measured reaction of the crush zone to the crash, and if so, modifying the triggering requirements, and deploying the occupant restraint device in consideration of the measured reaction of the crush zone to the crash and whether the second sensor has triggered.

* * * * *